(12) United States Patent
Hase et al.

(10) Patent No.: US 7,060,755 B2
(45) Date of Patent: Jun. 13, 2006

(54) OLEFIN THERMOPLASTIC ELASTOMER COMPOSITION AND COATED ELECTRIC WIRE

(75) Inventors: Tatsuya Hase, Yokkaichi (JP); Takahiko Sugita, Yokkaichi (JP); Hiroshi Fujimoto, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 12 days.

(21) Appl. No.: 10/353,987

(22) Filed: Jan. 30, 2003

(65) Prior Publication Data

US 2003/0176552 A1   Sep. 18, 2003

(30) Foreign Application Priority Data

Mar. 8, 2002   (JP) .............................. 2002-063237

(51) Int. Cl.
- *C08K 3/22* (2006.01)
- *C08K 23/26* (2006.01)
- *C08L 25/18* (2006.01)
- *H01B 3/44* (2006.01)
- *H01B 7/295* (2006.01)

(52) U.S. Cl. ...................... 525/207; 525/221; 525/232; 525/240; 525/241

(58) Field of Classification Search ................ 525/207, 525/221, 232, 240, 241
See application file for complete search history.

(56) References Cited

U.S. PATENT DOCUMENTS

| 4,480,074 | A | | 10/1984 | Wang |
| 4,594,390 | A | | 6/1986 | Abdou-Sabet et al. |
| 4,957,968 | A | * | 9/1990 | Adur et al. .................... 525/74 |
| 5,025,042 | A | * | 6/1991 | Yoshida et al. ............. 523/216 |
| 5,070,111 | A | | 12/1991 | Dumbauld |
| 5,349,005 | A | | 9/1994 | Tanaka |
| 5,561,185 | A | * | 10/1996 | Hashimoto et al. ......... 524/436 |
| 5,786,403 | A | * | 7/1998 | Okada et al. ............... 521/134 |
| 6,087,431 | A | * | 7/2000 | Uchida et al. .............. 524/490 |
| 6,384,143 | B1 | * | 5/2002 | Nishihara et al. ........... 525/191 |
| 6,462,121 | B1 | | 10/2002 | Sato et al. |

FOREIGN PATENT DOCUMENTS

| JP | 03079650 A | * | 4/1991 |
| WO | WO 8607078 A | * | 12/1986 |
| WO | WO 200061681 A1 | * | 10/2000 |

* cited by examiner

*Primary Examiner*—Kelechi C. Egwim
(74) *Attorney, Agent, or Firm*—Oliff & Berridge, PLC

(57) ABSTRACT

An olefin thermoplastic elastomer composition (component (a)) containing a dynamically crosslinked polyolefin thermoplastic elastomer; a polyolefin thermoplastic elastomer (component (b)); at least one polymer (component (c)) selected from among an ethylene copolymer, a hydrogenated styrene-butadiene rubber having functional groups, a styrene elastomer modified with acid anhydride, an ethylene-unsaturated carboxylic acid derivative copolymer modified with the acid anhydride, ethylene-propylene rubber modified with the acid anhydride, and polyethylene modified with the acid anhydride; and metal hydroxide (component (d)).

6 Claims, No Drawings

OLEFIN THERMOPLASTIC ELASTOMER COMPOSITION AND COATED ELECTRIC WIRE

BACKGROUND OF THE INVENTION

1. Field of Invention

The present invention relates to an olefin thermoplastic elastomer composition and a coated electric wire. More particularly, the present invention relates to a halogen-free olefin thermoplastic elastomer composition satisfying characteristics such as mechanical strength, electric wire extrusion processability, flexibility, wear resistance, and non-flammability which a material for coating the electric wire for use in a vehicle is required to have. The present invention also relates to the electric wire coated with the halogen-free olefin thermoplastic elastomer composition. The present application claims priority to Japanese Application No. 2002-063237, filed on Mar. 8, 2002.

2. Description of Related Art

Polyvinyl chloride has been mainly used as the material for coating electric wires for use in the vehicle. This is because the polyvinyl chloride is superior in mechanical strength, electric wire extrusion processability, flexibility, colorability, and economy.

However, in consideration of the recent movement for protecting global environment, halogen-free resinous materials have come to be used to manufacture component parts of the vehicle including the electric wire instead of the polyvinyl chloride.

Halogen-free resinous materials are known as wear-resistant resinous materials having an advantage of not generating a poisonous gas such as the halogen gas when it is burnt. The halogen-free resinous materials are formed by adding metal hydroxide to a polyolefin based polymer as a non-flammable agent (Japanese Patent Application Laid-Open Nos. 7-176219, 7-78518).

However, to make the resinous composition non-flammable to such an extent that it has self-extinguishing performance, it is necessary to add a large amount of the metal hydroxide to the polyolefin based polymer. However, the addition of a large amount of the metal hydroxide to the polyolefin based polymer causes the resinous composition to significantly reduce its mechanical strength such as wear resistance, tensile strength, and the like. To avoid reduction of the mechanical strength of the resinous composition, it is conceivable to increase the amount of polypropylene or high-density polyethylene having a comparatively high hardness. In this case, the electric wire coated with the resinous composition has low flexibility and processability.

SUMMARY OF THE INVENTION

It is an object of the present invention to provide a halogen-free olefin thermoplastic elastomer composition satisfying characteristics such as wear resistance, non-flammability, tensile characteristic, and flexibility which a material for coating electric wires for use in a vehicle is required to have in stable balance.

To achieve the object, the present invention provides an olefin thermoplastic elastomer composition containing:

(component (a)) 20 to 70 parts by mass of a dynamically crosslinked polyolefin thermoplastic elastomer;

(component (b)) 20 to 40 parts by mass of a polyolefin thermoplastic elastomer;

(component (c)) 10 to 40 parts by mass of at least one polymer selected from among the following polymers (c1) through (c6):

(c1) an ethylene copolymer;

(c2) a hydrogenated styrene-butadiene rubber having functional groups;

(c3) a styrene elastomer modified with acid anhydride;

(c4) an ethylene-unsaturated carboxylic acid derivative copolymer modified with the acid anhydride;

(c5) ethylene-propylene rubber modified with the acid anhydride; and (c6) polyethylene modified with the acid anhydride; and (component (d)) 30 to 200 parts by mass of metal hydroxide.

The olefin thermoplastic elastomer composition contains the components (component (a)), (component (b)), and (component (c)) in such a way that a total of parts by mass of the components (component (a)), (component (b)), and (component (c)) is 100.

DETAILED DESCRIPTION OF PREFERRED EMBODIMENTS

Components contained in the olefin thermoplastic elastomer composition of the present invention will be described below.

Component (a): Dynamically Crosslinked Polyolefin Thermoplastic Elastomer

The dynamically crosslinked polyolefin thermoplastic elastomer is composed of a polyolefin thermoplastic elastomer serving as a matrix in which particles of dynamically crosslinked olefin rubber (for example, EPDM, IIR) are dispersed.

The polyolefin thermoplastic elastomer contains olefin as its main component (namely, more than 50 wt % of repeating unit). It is preferable that the olefin has two to six carbon atoms and more preferable that it has two to four carbon atoms. As the olefin, ethylene, propylene, and butylene are preferable.

The polyolefin thermoplastic elastomer may be a single polymer or a copolymer. Although the kind of the copolymer is not limited to a specific one, a propylene-ethylene-propylene copolymer is preferable.

The Shore A hardness of the dynamically crosslinked polyolefin thermoplastic elastomer is preferably not less than 80 and more preferably not less than 90. When the dynamically crosslinked polyolefin thermoplastic elastomer has a Shore A hardness lower than 80, the olefin thermoplastic elastomer composition does not have a high surface hardness, and its wear resistance is liable to be low.

The mixing amount of the dynamically crosslinked polyolefin thermoplastic elastomer (component (a)) is preferably in the range of 20 to 70 parts by mass and more preferably in the range of 30 to 60 parts by mass per total parts by mass (100 parts by mass) of the components (component (a)), (component (b)), and (component (c)). If the mixing amount of the dynamically crosslinked polyolefin thermoplastic elastomer (component (a)) is less than 20 parts by mass, the olefin thermoplastic elastomer composition has low heat shrinkability. On the other hand, if the mixing amount of the dynamically crosslinked polyolefin thermoplastic elastomer (component (a)) is more than 70 parts by mass, the olefin thermoplastic elastomer composition has insufficient flexibility.

(Component (b)): Polyolefin Thermoplastic Elastomer

The polyolefin thermoplastic elastomer is composed of a polyolefin matrix in which particles of unhardened olefin rubber (for example, EPDM, IIR) are dispersed, as described in the item of the component (a).

The Shore A hardness of the polyolefin thermoplastic elastomer is normally not less than 80 and preferably not less than 90. When the polyolefin thermoplastic elastomer has a low Shore A hardness less than 80, it does not have a high surface hardness and its wear resistance is liable to be low.

The mixing amount of the polyolefin thermoplastic elastomer (component (b)) is preferably in the range of 20 to 40 parts by mass and more preferably in the range of 15 to 35 parts by mass per total parts by mass (100 parts by mass) of the components (component (a)), (component (b)), and (component (c)). If the mixing amount of the polyolefin thermoplastic elastomer (component (b)) is less than 20 parts by mass, the olefin thermoplastic elastomer composition has insufficient flexibility. On the other hand, if the mixing amount of the dynamically crosslinked polyolefin thermoplastic elastomer (component (a)) is more than 40 parts by mass, the olefin thermoplastic elastomer composition has low heat shrinkability.

(c1) Ethylene Copolymer

The ethylene copolymer (c1) is formed by copolymerization of ethylene and a co-monomer copolymerizable therewith. The co-monomer includes unsaturated carboxylic acid derivatives (for example, vinyl acetate, ethyl acrylate, ethyl methacrylate).

(c2) Hydrogenated Styrene-Butadiene Rubber Having Functional Groups

The hydrogenated styrene-butadiene rubber having functional groups has 0.1 to 10 mass % of functional groups (for example, carboxyl group, carboxyl group anhydride, amino group, and silane group). The hydrogenated styrene-butadiene rubber is formed by adding hydrogen to an unsaturated group of styrene-butadiene rubber.

Normally, the hydrogenated styrene-butadiene rubber having the functional groups has a melt flow rate (MFR) of 0.1 to 5 g per 10 minutes.

(c3) Styrene Elastomer Modified with Acid Anhydride

To obtain the styrene elastomer modified with acid anhydride, a block copolymer is obtained by polymerizing styrene with olefin (for example, butadiene, ethylene/propylene). Hydrogen is added to a double bond of the block copolymer to saturate the double bond. Then the obtained styrene elastomer is modified with 0.1 to 10 wt % of the acid anhydride (for example, maleic anhydride).

(c4) Ethylene-Unsaturated Carboxylic Acid Derivative Copolymer Modified with Acid Anhydride The ethylene-unsaturated carboxylic acid derivative copolymer modified with acid anhydride is obtained by modifying an ethylene-unsaturated carboxylic acid derivative copolymer with 0.1 to 10 wt % of acid anhydride (for example, maleic anhydride). Unsaturated carboxylic acid derivatives that copolymerize with the ethylene include vinyl acetate, ethyl acrylate, and ethyl methacrylate. Normally, the ethylene-unsaturated carboxylic acid derivative copolymer modified with the acid anhydride has a Shore A hardness of less than 95.

(c5) Ethylene-Propylene Rubber Modified with Acid Anhydride

The ethylene-propylene rubber modified with acid anhydride is obtained by modifying ethylene-propylene rubber with 0.1 to 10 wt % of acid anhydride (for example, maleic anhydride). Normally, the ethylene-propylene rubber modified with acid anhydride has a Shore A hardness less than 75.

(c6) Polyethylene Modified with Acid Anhydride

The polyethylene modified with acid anhydride is obtained by modifying polyethylene (for example, low-density polyethylene, straight-chain low-density polyethylene) with 0.1 to 10 wt % of acid anhydride (for example, maleic anhydride). Normally, the ethylene-propylene rubber modified with acid anhydride has a Shore A hardness less than 50.

The mixing amount of at least one polymer (component (c)) selected from among the polymers (c1) to (c6) is 10 to 40 parts by mass and preferably 15 to 35 parts by mass per total parts by mass (100 parts by mass) of the components (a), (b), and (c). If the mixing amount of the polymer (component (c)) is less than 10 parts by mass, the olefin thermoplastic elastomer composition has low processability. On the other hand, if the mixing amount of the polymer (component (c)) is more than 40 parts by mass, the olefin thermoplastic elastomer composition has low heat shrinkability.

As the metal hydroxide (d), it is possible to use magnesium hydroxide, aluminum hydroxide, and the like. It is preferable to surface-treat particles of the metal hydroxide with a surface treatment agent such as a coupling agent and in particular a silane coupling agent (amino silane coupling agent, vinyl silane coupling agent, and epoxy silane coupling agent) or higher fatty acid (for example, stearic acid, oleic acid). The magnesium hydroxide and the aluminum hydroxide surface-treated with the amino silane coupling agent are very preferable.

The ratio of the metal hydroxide to the total amount (100 parts by weight) of the components (a), (b), and (c) contained in the olefin thermoplastic elastomer composition is preferably in the range of 30 to 200 parts by weight and more preferably in the range of 50 to 150 parts by weight.

If the ratio of the metal hydroxide is too high, the olefin thermoplastic elastomer composition has low flexibility and processability. On the other hand, if the ratio of the metal hydroxide is too low, the olefin thermoplastic elastomer composition has low non-flammability.

A proper amount of a compounding ingredient such as an antioxidant, a copper inhibitor, and a lubricant which are normally added to the olefin thermoplastic elastomer may be added to the olefin thermoplastic elastomer composition of the present invention so long as the compounding ingredient does not deteriorate the above-described characteristics.

It is possible to prepare the olefin thermoplastic elastomer composition of the present invention by mixing and kneading the above-described components (a), (b), and (c) by a conventional method. Also, conventional methods can be used to coat electric wires and in particular electric wire for use in vehicles with the olefin thermoplastic elastomer composition of the present invention.

EXAMPLES

Examples and Comparison Examples will be shown below to describe the present invention more specifically. The characteristic of the olefin thermoplastic elastomer composition of each of the Examples and the Comparison Examples and that of coated electric wire thereof were evaluated as follows:

Heat Shrinkability and Non-Flammability

The heat shrinkability and non-flammability were evaluated in conformity to D 611 of JASO (Japan Automobile Technical Organization)

Flexibility

The flexibility was measured by the feel when the electric wires were bent.

Processability

The processability was evaluated according to whether whiskers were formed on the electric wires when the olefin thermoplastic elastomer composition was torn off from an end of each electric wire.

Examples 1 to 5 and Comparison Examples 1 to 6

The components shown in Tables 1 and 2 were kneaded at 200° C. to 220° C. by using a biaxial extruder. Amounts of the components used are also shown in Tables 1 and 2.

Obtained olefin thermoplastic elastomer compositions were molded in a thickness of 0.7 mm onto the periphery of a conductor having an area of 3 mm$^2$ (41/0.32 copper wire) by extrusion. Dies having a diameter 3.80 mm and a nipple having a diameter 2.40 mm were used in the extrusion operation. The extrusion temperature was set to 210° C. to 210° C. at the dies and 180° C. to 200° C. at a cylinder. The linear speed was 30 m/minute.

Evaluation of the characteristic of each of the olefin thermoplastic elastomer compositions and the electric wires is shown in Tables 1 and 2.

TABLE 1

|  | E1 | E2 | E3 | E4 | E5 |
|---|---|---|---|---|---|
| Dynamically crosslinked TPO[1] | 40 | 70 | 20 | 35 | 50 |
| TPO[2] | 40 | 20 | 40 | 35 | 20 |
| EVA[3] | 20 | 10 | 40 | 30 | 30 |
| Magnesium hydroxide A[4] | 80 |  | 100 |  |  |
| Magnesium hydroxide B[5] |  | 120 |  | 200 | 30 |
| Age resistor[6] | 1 | 1 | 3 | 1 | 0.5 |
| Metal-inactivating agent[7] | 1 | 0.5 | 1 | 1 | 0.5 |
| Total | 182 | 221.5 | 204 | 302 | 131 |
| Heat shrinkability | Acceptable | Acceptable | Acceptable | Acceptable | Acceptable |
| Non-flammability | Acceptable | Acceptable | Acceptable | Acceptable | Acceptable |
| Flexibility | Acceptable | Acceptable | Acceptable | Acceptable | Acceptable |
| Processability | Acceptable | Acceptable | Acceptable | Acceptable | Acceptable |

TABLE 2

|  | CE1 | CE2 | CE3 | CE4 | CE5 | CE6 |
|---|---|---|---|---|---|---|
| Dynamically crosslinked TPO[1] | 40 | 70 | 20 | 35 | 50 | 50 |
| TPO[2] | 40 | 20 | 40 | 35 | 20 | 30 |
| EVA[3] | 20 | 10 | 40 | 30 | 30 | 20 |
| Magnesium hydroxide A[4] | 80 |  | 100 |  |  |  |
| Magnesium hydroxide B[5] |  | 120 |  | 200 | 30 | 250 |
| Age resistor[6] | 1 | 1 | 3 | 1 | 0.5 | 1 |
| Metal-inactivating agent[7] | 1 | 0.5 | 1 | 1 | 0.5 | 1 |
| Total | 182 | 221.5 | 204 | 302 | 131 | 352 |
| Heat shrinkability | Unacceptable | Acceptable | Acceptable | Unacceptable | Acceptable | Acceptable |
| Non-flammability | Acceptable | Acceptable | Acceptable | Acceptable | Unacceptable | Acceptable |
| Flexibility | Acceptable | Unacceptable | Acceptable | Acceptable | Acceptable | Unacceptable |
| Processability | Acceptable | Acceptable | Unacceptable | Acceptable | Acceptable | Unacceptable |

Note:
Reference symbol E in Table 1 denotes Example, and reference symbol CE in Table 2 denotes Comparison Example.
[1]Dynamically crosslinked thermoplastic polyolefin: "Sarlink 3145D" (Shore D hardness: 48) produced by Toyo Boseki Kabushiki Kaisha.
[2]Thermoplastic polyolefin: "PER T310J" (Shore A hardness: 90) produced by Idemitsu Sekiyukagaku Kabushiki Kaisha.
[3]Ethylene-vinyl acetate copolymer: "EV360" produced by Dupont-Mitsui Polychemicals Co., Ltd.
[4]Magnesium hydroxide surface-treated with amino silane coupling agent: "Magnifin H10IV" (average particle diameter: 1.0 μm) produced by Martinswerk, Inc.
[5]Magnesium hydroxide (untreated): "Magnifin H10" (average particle diameter: 1.0 μm) produced by Martinwerk, Inc.
[6]Age resistor consisting of hindered amine: "Irganox 1010" produced by Ciba Specialty Chemicals Kabushiki Kaisha.
[7]Copper inhibitor consisting of amide compound: "CDA-1" produced by Asahi Denka Kogyo Kabushiki Kaisha.

The results shown in Tables 1 and 2 indicate the following facts:

Because the mixing amount of the dynamically crosslinked polyolefin thermoplastic elastomer (component (a)) of the Comparison Example 1 is small and that of the polyolefin thermoplastic elastomer (component (b)) thereof is large, the olefin thermoplastic elastomer composition thereof has low heat shrinkability.

Because the mixing amount of the dynamically crosslinked polyolefin thermoplastic elastomer (component (a)) of the Comparison Example 2 is large and that of the polyolefin thermoplastic elastomer (component (b)) thereof is small, the olefin thermoplastic elastomer composition thereof has low flexibility.

Because the mixing amount of the ethylene copolymer (c1) of the comparison Example 3 is small, the olefin thermoplastic elastomer composition thereof has low processability. Because the mixing amount of the ethylene copolymer (c1) of the Comparison Example 4 is large, the olefin thermoplastic elastomer composition thereof has low heat shrinkability.

Because the addition amount of the metal hydroxide (d) of the Comparison Example 5 is small, the olefin thermoplastic elastomer composition thereof has low non-flammability. Because the addition amount of the metal hydroxide (d) of the Comparison Example 6 is large, the olefin thermoplastic elastomer composition thereof has low flexibility and processability.

Examples 6 Through 10 and Comparison Examples 7 Through 12

Except that components shown in Tables 3 and 4 were used in amounts shown therein, thermoplastic elastomer compositions were prepared similarly to the Examples 1 through 5, and electric wires were coated therewith.

Evaluation of the characteristic of each of the olefin thermoplastic elastomer compositions and the electric wires is shown in Tables 3 and 4.

TABLE 3

| | E6 | E7 | E8 | E9 | E10 |
|---|---|---|---|---|---|
| Dynamically crosslinked TPO[1] | 40 | 70 | 20 | 35 | 50 |
| TPO[2] | 40 | 20 | 40 | 35 | 20 |
| Modified SBR[8] | 20 | 10 | 40 | 30 | 30 |
| HSBR[9] | | | | | |
| Magnesium hydroxide A[4] | 80 | | 100 | | |
| Magnesium hydroxide B[5] | | 120 | | 200 | 30 |
| Age resistor[6] | 1 | 1 | 3 | 1 | 0.5 |
| Metal-inactivating agent[7] | 1 | 0.5 | 1 | 1 | 0.5 |
| Total | 182 | 221.5 | 204 | 302 | 131 |
| Heat shrinkability | Acceptable | Acceptable | Acceptable | Acceptable | Acceptable |
| Non-flammability | Acceptable | Acceptable | Acceptable | Acceptable | Acceptable |
| Flexibility | Acceptable | Acceptable | Acceptable | Acceptable | Acceptable |
| Processability | Acceptable | Acceptable | Acceptable | Acceptable | Acceptable |

TABLE 4

| | CE7 | CE8 | CE9 | CE10 | CE11 | CE12 |
|---|---|---|---|---|---|---|
| Dynamically crosslinked TPO[1] | 10 | 80 | 60 | 20 | 40 | 50 |
| TPO[2] | 50 | 10 | 35 | 20 | 30 | 30 |
| Modified SBR[8] | 40 | | 5 | 60 | 30 | 20 |
| HSBR[9] | | 10 | | | | |
| Magnesium hydroxide A[4] | 100 | 70 | | | 20 | |
| Magnesium hydroxide B[5] | | | 120 | 80 | | 250 |
| Age resistor[6] | 2 | 0.5 | 1 | 1 | 1 | 1 |
| Metal-inactivating agent[7] | 1 | 0.5 | 1 | 1 | 0.5 | 1 |
| Total | 203 | 171 | 222 | 182 | 121.5 | 352 |
| Heat shrinkability | Unacceptable | Acceptable | Acceptable | Unacceptable | Acceptable | Acceptable |
| Non-flammability | Acceptable | Acceptable | Acceptable | Acceptable | Unacceptable | Acceptable |
| Flexibility | Acceptable | Unacceptable | Acceptable | Acceptable | Acceptable | Unacceptable |
| Processability | Acceptable | Unacceptable | Unacceptable | Acceptable | Acceptable | Unacceptable |

Note:
Reference symbol E in Table 3 denotes Example, and reference symbol CE in Table 4 denotes Comparison Example. Regarding notes 1), 2), 4) through 7) of Tables 3 and 4, refer to notes 1), 2), 4) through 7) of Tables 1 and 2.
[8]Modified hydrogenated styrene-butadiene rubber (containing functional group): MFR (230° C., 2.16 kg) = 5 g/10 minute) produced by JSR Kabushiki Kaisha.
[9]Hydrogenated styrene-butadiene rubber: "Dynaron 1320P" (MFR (230° C., 2.16 kg) = 5 g/10 minute) produced by JSR Kabushiki Kaisha.

The results shown in Tables 3 and 4 indicate the following facts:

Because the mixing amount of the dynamically crosslinked polyolefin thermoplastic elastomer (component (a)) is small and that of the polyolefin thermoplastic elastomer (component (b)) is large in the Comparison Example 7, the olefin thermoplastic elastomer composition thereof has low heat shrinkability.

Because the mixing amount of the dynamically crosslinked polyolefin thermoplastic elastomer (component (a)) is large and that of the polyolefin thermoplastic elastomer (component (b)) is small in the Comparison Example 8, the olefin thermoplastic elastomer composition thereof has low flexibility. The processability of the olefin thermoplastic elastomer composition cannot be improved by the use of the unmodified hydrogenated styrene-butadiene rubber.

Because the mixing amount of the hydrogenated styrene-butadiene rubber (component (c2)) having the functional groups is small in the Comparison Example 9, the olefin thermoplastic elastomer composition thereof has low processability. Because the mixing amount of the hydrogenated styrene-butadiene rubber (component (c2)) having the functional groups is large in the Comparison Example 10, the olefin thermoplastic elastomer composition thereof has low heat shrinkability.

Because the addition amount of the metal hydroxide (component (d)) is small in the Comparison Example 11, the olefin thermoplastic elastomer composition thereof has low non-flammability. Because the addition amount of the metal hydroxide (component (d)) is large in the Comparison Example 12, the olefin thermoplastic elastomer composition thereof has low flexibility and processability.

Examples 11 Through 15 and Comparison Examples 13 Through 18

Except that components shown in Tables 5 and 6 were used in amounts shown therein, thermoplastic elastomer compositions were prepared similarly to the Examples 1 through 5, and electric wires were coated therewith.

Evaluation of the characteristic of each of the olefin thermoplastic elastomer compositions and the electric wires is shown in Tables 5 and 6.

TABLE 5

| | E6 | E7 | E8 | E9 | E10 |
|---|---|---|---|---|---|
| Dynamically crosslinked TPO[1] | 40 | 70 | 20 | 35 | 50 |
| TPO[2] | 40 | 20 | 40 | 35 | 20 |
| Modified SEBS[10] | 20 | 10 | 40 | 30 | 30 |
| SEBS[11] | | | | | |
| Magnesium hydroxide A[4] | 80 | | 100 | | |
| Magnesium hydroxide B[5] | | 120 | | 200 | 30 |
| Age resistor[6] | 1 | 1 | 3 | 1 | 0.5 |
| Metal-inactivating agent[7] | 1 | 0.5 | 1 | 1 | 0.5 |
| Total | 182 | 221.5 | 204 | 302 | 131 |
| Heat shrinkability | Acceptable | Acceptable | Acceptable | Acceptable | Acceptable |
| Non-flammability | Acceptable | Acceptable | Acceptable | Acceptable | Acceptable |
| Flexibility | Acceptable | Acceptable | Acceptable | Acceptable | Acceptable |
| Processability | Acceptable | Acceptable | Acceptable | Acceptable | Acceptable |

TABLE 6

| | CE7 | CE8 | CE9 | CE10 | CE11 | CE12 |
|---|---|---|---|---|---|---|
| Dynamically crosslinked TPO[1] | 10 | 80 | 60 | 20 | 40 | 50 |

TABLE 6-continued

|  | CE7 | CE8 | CE9 | CE10 | CE11 | CE12 |
|---|---|---|---|---|---|---|
| TPO[2] | 50 | 10 | 35 | 20 | 30 | 30 |
| Modified SEBS[10] | 40 |  |  | 5 | 30 | 20 |
| SEBS[11] |  | 10 |  |  |  |  |
| Magnesium hydroxide A[4] | 100 | 70 |  |  | 20 |  |
| Magnesium hydroxide B[5] |  |  | 120 | 80 |  | 250 |
| Age resistor[6] | 2 | 0.5 | 1 | 1 | 1 | 1 |
| Metal-inactivating agent[7] | 0.5 | 0.5 | 1 | 1 | 0.5 | 1 |
| Total | 202.5 | 171 | 222 | 182 | 121.5 | 352 |
| Heat shrinkability | Unacceptable | Acceptable | Acceptable | Unacceptable | Acceptable | Acceptable |
| Non-flammability | Acceptable | Acceptable | Acceptable | Acceptable | Unacceptable | Acceptable |
| Flexibility | Acceptable | Unacceptable | Acceptable | Acceptable | Acceptable | Unacceptable |
| Processability | Acceptable | Unacceptable | Unacceptable | Acceptable | Acceptable | Unacceptable |

Note:
Reference symbol E in Table 5 denotes Example, and reference symbol CE in Table 6 denotes Comparison Example. Regarding notes 1), 2), 4) through 7) of Tables 5 and 6, refer to notes 1), 2), 4) through 7) of Tables 1 and 2.
[10] Styrene-ethylene/butadiene-styrene copolymer modified with maleic anhydride: "TUFTEC M1913" (MFR (230° C., 2.16 kg) = 5 g/10 minute) produced by Asahi Kasei Kabushiki Kaisha.
[11] Styrene-ethylene/butadiene-styrene copolymer: "TUFTEC H1041" (MFR (230° C., 2.16 kg) = 5 g/10 minute) produced by Asahi Kasei Kabushiki Kaisha.

The results shown in Tables 5 and 6 indicate the following facts:

Because the mixing amount of the dynamically crosslinked polyolefin thermoplastic elastomer (component (a)) is small and that of the polyolefin thermoplastic elastomer (component (b)) is large in the Comparison Example 13, the olefin thermoplastic elastomer composition thereof has low heat shrinkability.

Because the mixing amount of the dynamically crosslinked polyolefin thermoplastic elastomer (component (a)) is large and that of the polyolefin thermoplastic elastomer (component (b)) is small in the Comparison Example 14, the olefin thermoplastic elastomer composition thereof has low flexibility. The processability of the olefin thermoplastic elastomer composition cannot be improved by the use of the unmodified styrene-ethylene/butadiene-styrene copolymer.

Because the mixing amount of the styrene elastomer (component (c3)) modified with acid anhydride is small in the Comparison Example 15, the olefin thermoplastic elastomer composition thereof has low processability. Because the mixing amount of the styrene elastomer (component (c3)) modified with acid anhydride is large in the Comparison Example 16, the olefin thermoplastic elastomer composition thereof has low heat shrinkability.

Because the addition amount of the metal hydroxide (component (d)) is small in the Comparison Example 17, the olefin thermoplastic elastomer composition thereof has low non-flammability. Because the addition amount of the metal hydroxide (component (d)) is large in the Comparison Example 18, the olefin thermoplastic elastomer composition thereof has low flexibility and processability.

Examples 16 Through 20 and Comparison Examples 19 Through 24

Except that components shown in Tables 7 and 8 were used in amounts shown therein, thermoplastic elastomer compositions were prepared similarly to the Examples 1 through 5, and electric wires were coated therewith.

Evaluation of the characteristic of each of the olefin thermoplastic elastomer compositions and the electric wires is shown in Tables 7 and 8.

TABLE 7

|  | E16 | E17 | E18 | E19 | E20 |
|---|---|---|---|---|---|
| Dynamically crosslinked TPO[1] | 40 | 70 | 20 | 35 | 50 |
| TPO[2] | 40 | 20 | 40 | 35 | 20 |
| Modified EVA[12] | 20 | 10 |  | 30 |  |
| Modified EEA[13] |  |  | 40 |  | 30 |
| Magnesium hydroxide A[4] | 80 |  | 100 |  |  |
| Magnesium hydroxide B[5] |  | 120 |  | 200 | 30 |
| Age resistor[6] | 1 | 1 | 3 | 1 | 0.5 |
| Metal-inactivating agent[7] | 1 | 0.5 | 1 | 1 | 0.5 |
| Total | 182 | 221.5 | 204 | 302 | 131 |
| Heat shrinkability | Acceptable | Acceptable | Acceptable | Acceptable | Acceptable |
| Non-flammability | Acceptable | Acceptable | Acceptable | Acceptable | Acceptable |
| Flexibility | Acceptable | Acceptable | Acceptable | Acceptable | Acceptable |
| Processability | Acceptable | Acceptable | Acceptable | Acceptable | Acceptable |

TABLE 8

|  | CE19 | CE20 | CE21 | CE22 | CE23 | CE24 |
|---|---|---|---|---|---|---|
| Dynamically crosslinked TPO[1] | 10 | 80 | 60 | 20 | 40 | 50 |
| TPO[2] | 50 | 10 | 35 | 20 | 30 | 30 |
| Modified EVA[12] | 40 |  | 5 |  | 30 | 20 |
| Modified EEA[13] |  | 10 |  |  |  |  |
| Magnesium hydroxide A[4] | 100 | 70 |  |  | 20 |  |
| Magnesium hydroxide B[5] |  |  | 120 | 80 |  | 250 |
| Age resistor[6] | 2 | 0.5 | 1 | 1 | 1 | 1 |
| Metal-inactivating agent[7] | 0.5 | 0.5 | 1 | 1 | 0.5 | 1 |
| Total | 202.5 | 171 | 222 | 182 | 121.5 | 352 |
| Heat shrinkability | Unacceptable | Acceptable | Acceptable | Unacceptable | Acceptable | Acceptable |
| Non-flammability | Acceptable | Acceptable | Acceptable | Acceptable | Unacceptable | Acceptable |
| Flexibility | Acceptable | Unacceptable | Acceptable | Acceptable | Acceptable | Unacceptable |

TABLE 8-continued

|  | CE19 | CE20 | CE21 | CE22 | CE23 | CE24 |
|---|---|---|---|---|---|---|
| Processability | Acceptable | Acceptable | Unacceptable | Acceptable | Acceptable | Unacceptable |

Note:
Reference symbol E in Table 7 denotes Example, and reference symbol CE in Table 8 denotes Comparison Example. Regarding notes 1), 2), 4) through 7) of Tables 7 and 8, refer to notes 1), 2), 4) through 7) of Tables 1 and 2.
[13] Ethylene-vinyl acetate copolymer modified with maleic anhydride: "HPR VR103" (MFR (190° C., 2.16 kg) = 8 g/10 minute) produced by Dupont-Mitsui Polychemicals, Co., Ltd.
[14] ethylene-ethyl acrylate copolymer modified with maleic anhydride: "HPR AR201" (MFR (190° C., 2.16 kg) = 7 g/10 minute) produced by Dupont-Mitsui Polychemicals, Co., Ltd.

The results shown in Tables 7 and 8 indicate the following facts:

Because the mixing amount of the dynamically crosslinked polyolefin thermoplastic elastomer (component (a)) is small and that of the polyolefin thermoplastic elastomer (component (b)) is large in the Comparison Example 19, the olefin thermoplastic elastomer composition thereof has low heat shrinkability.

Because the mixing amount of the dynamically crosslinked polyolefin thermoplastic elastomer (component (a)) is large and that of the polyolefin thermoplastic elastomer (component (b)) is small in the Comparison Example 20, the olefin thermoplastic elastomer composition thereof has low flexibility.

Because the mixing amount of the ethylene-unsaturated carboxylic acid derivative copolymer (component (c4)) modified with the acid anhydride is small in the Comparison Example 21, the olefin thermoplastic elastomer composition thereof has low processability. Because the mixing amount of the ethylene-unsaturated carboxylic acid derivative copolymer (component (c4)) modified with the acid anhydride is large in the Comparison Example 22, the olefin thermoplastic elastomer composition thereof has low heat shrinkability.

Because the addition amount of the metal hydroxide (component (d)) is small in the Comparison Example 23, the olefin thermoplastic elastomer composition thereof has low non-flammability. Because the addition amount of the metal hydroxide (component (d)) is large in the Comparison Example 24, the olefin thermoplastic elastomer composition thereof has low flexibility and processability.

Examples 21 Through 25 and Comparison Examples 25 Through 30

Except that components shown in Tables 9 and 10 were used in amounts shown therein, thermoplastic elastomer compositions were prepared similarly to the Examples 1 through 5, and electric wires were coated therewith.

Evaluation of the characteristic of each of the olefin thermoplastic elastomer compositions and the electric wires is shown in Tables 9 and 10.

TABLE 9

|  | E21 | E22 | E23 | E24 | E25 |
|---|---|---|---|---|---|
| Dynamically crosslinked TPO[1] | 40 | 70 | 20 | 35 | 50 |
| TPO[2] | 40 | 20 | 40 | 35 | 20 |

TABLE 9-continued

|  | E21 | E22 | E23 | E24 | E25 |
|---|---|---|---|---|---|
| Modified EPR[14] | 20 | 10 | 40 | 30 |  |
| EPR[15] |  |  |  |  | 30 |
| Magnesium hydroxide A[4] | 80 |  | 100 |  |  |
| Magnesium hydroxide B[5] |  | 120 |  | 200 | 30 |
| Age resistor[6] | 1 | 1 | 3 | 1 | 0.5 |
| Metal-inactivating agent[7] | 1 | 0.5 | 1 | 1 | 0.5 |
| Total | 182 | 221.5 | 204 | 302 | 131 |
| Heat shrinkability | Acceptable | Acceptable | Acceptable | Acceptable | Acceptable |
| Non-flammability | Acceptable | Acceptable | Acceptable | Acceptable | Acceptable |
| Flexibility | Acceptable | Acceptable | Acceptable | Acceptable | Acceptable |
| Processability | Acceptable | Acceptable | Acceptable | Acceptable | Acceptable |

TABLE 10

|  | CE25 | CE26 | CE27 | CE28 | CE29 | CE30 |
|---|---|---|---|---|---|---|
| Dynamically crosslinked TPO[1] | 10 | 80 | 60 | 20 | 40 | 50 |
| TPO[2] | 50 | 10 | 35 | 20 | 30 | 30 |
| Modified EPR[14] | 40 |  | 5 | 60 | 30 | 20 |
| EPR[15] |  | 10 |  |  |  |  |
| Magnesium hydroxide A[4] | 100 | 70 |  |  | 20 |  |
| Magnesium hydroxide B[5] |  |  | 120 | 80 |  | 250 |
| Age resistor[6] | 2 | 0.5 | 1 | 1 | 1 | 1 |
| Metal-inactivating agent[7] | 0.5 | 0.5 | 1 | 1 | 0.5 | 1 |
| Total | 202.5 | 171 | 222 | 182 | 121.5 | 352 |
| Heat shrinkability | Unacceptable | Acceptable | Acceptable | Unacceptable | Acceptable | Acceptable |
| Non-flammability | Acceptable | Acceptable | Acceptable | Acceptable | Unacceptable | Acceptable |
| Flexibility | Acceptable | Unacceptable | Acceptable | Acceptable | Acceptable | Unacceptable |
| Processability | Acceptable | Unacceptable | Unacceptable | Acceptable | Acceptable | Unacceptable |

Note:
Reference symbol E in Table 9 denotes Example, and reference symbol CE in Table 10 denotes Comparison Example. Regarding notes 1), 2), 4) through 7) of Tables 9 and 10, refer to notes 1), 2), 4) through 7) of Tables 1 and 2.
[14] Ethylene-propylene rubber modified with maleic anhydride: "T7741P" (MFR (230° C., 2.16 kg) = 0.9 g/10 minutes, Shore A hardness: 57) produced by JSR Kabushiki Kaisha.
[15] Ethylene-propylene rubber: "EP02P" (MFR (230° C., 2.16 kg) = 5 g/10 minutes, shore A hardness: 55) produced by JSR Kabushiki Kaisha.

The results shown in Tables 9 and 10 indicate the following facts:

Because the mixing amount of the dynamically crosslinked polyolefin thermoplastic elastomer (component (a)) is small and that of the polyolefin thermoplastic elastomer (component (b)) is large in the Comparison Example 25, the olefin thermoplastic elastomer composition thereof has low heat shrinkability.

Because the mixing amount of the dynamically crosslinked polyolefin thermoplastic elastomer (component (a)) is large and that of the polyolefin thermoplastic elastomer (component (b)) is small in the Comparison Example 26, the olefin thermoplastic elastomer composition thereof has low flexibility. The processability of the olefin thermoplastic elastomer composition cannot be improved by the use of the unmodified ethylene-propylene rubber.

Because the mixing amount of the ethylene-propylene rubber (component (c5)) modified with the acid anhydride is small in the Comparison Example 27, the olefin thermoplastic elastomer composition thereof has low processability. Because the mixing amount of the ethylene-propylene rubber (component (c5)) modified with the acid anhydride is large in the Comparison Example 28, the olefin thermoplastic elastomer composition thereof has low heat shrinkability.

Because the addition amount of the metal hydroxide (component (d)) is small in the Comparison Example 29, the olefin thermoplastic elastomer composition thereof has low non-flammability. Because the addition amount of the metal hydroxide (component (d)) is large in the Comparison Example 30, the olefin thermoplastic elastomer composition thereof has low flexibility and processability.

Examples 26 Through 30 and Comparison Examples 31 Through 36

Except that components shown in Tables 11 and 12 were used in amounts shown therein, thermoplastic elastomer compositions were prepared similarly to the Examples 1 through 5, and electric wires were coated therewith.

Evaluation of the characteristic of each of the olefin thermoplastic elastomer compositions and the electric wires is shown in Tables 11 and 12.

TABLE 11

|  | E26 | E27 | E28 | E29 | E30 |
|---|---|---|---|---|---|
| Dynamically crosslinked TPO[1] | 40 | 70 | 20 | 35 | 50 |
| TPO[2] | 40 | 20 | 40 | 35 | 20 |
| Modified LDPE[16] |  | 10 | 40 |  | 30 |
| Modified LDPE[17] | 20 |  |  | 30 |  |
| Magnesium hydroxide A[4] | 80 |  | 100 |  |  |
| Magnesium hydroxide B[5] |  | 120 |  | 200 | 30 |
| Age resistor[6] | 1 | 1 | 3 | 1 | 0.5 |
| Metal-inactivating agent[7] | 1 | 0.5 | 1 | 1 | 0.5 |
| Total | 182 | 221.5 | 204 | 302 | 131 |
| Heat shrinkability | Acceptable | Acceptable | Acceptable | Acceptable | Acceptable |
| Non-flammability | Acceptable | Acceptable | Acceptable | Acceptable | Acceptable |
| Flexibility | Acceptable | Acceptable | Acceptable | Acceptable | Acceptable |
| Processability | Acceptable | Acceptable | Acceptable | Acceptable | Acceptable |

TABLE 12

|  | CE31 | CE32 | CE33 | CE34 | CE35 | CE36 |
|---|---|---|---|---|---|---|
| Dynamically crosslinked TPO[1] | 10 | 80 | 60 | 20 | 40 | 50 |
| TPO[2] | 50 | 10 | 35 | 20 | 30 | 30 |
| Modified LDPE[16] | 40 | 10 |  | 60 |  | 20 |
| Modified LDPE[17] |  |  | 5 |  | 30 |  |
| Magnesium hydroxide A[4] | 100 | 70 |  |  | 20 |  |
| Magnesium hydroxide B[5] |  |  | 120 | 80 |  | 250 |
| Age resistor[6] | 2 | 0.5 | 1 | 1 | 1 | 1 |
| Metal-inactivating agent[7] | 0.5 | 0.5 | 1 | 1 | 0.5 | 1 |
| Total | 202.5 | 171 | 222 | 182 | 121.5 | 352 |
| Heat shrinkability | Unacceptable | Acceptable | Acceptable | Unacceptable | Acceptable | Acceptable |
| Non-flammability | Acceptable | Acceptable | Acceptable | Acceptable | Unacceptable | Acceptable |
| Flexibility | Acceptable | Unacceptable | Acceptable | Acceptable | Acceptable | Unacceptable |
| Processability | Acceptable | Acceptable | Unacceptable | Acceptable | Acceptable | Unacceptable |

Note:
Reference symbol E in Table 11 denotes Example, and reference symbol CE in Table 12 denotes Comparison Example. Regarding notes 1), 2), 4) through 7) of Tables 11 and 12, refer to notes 1), 2), 4) through 7) of Tables 1 and 2.
[16]Low-density polyethylene modified with maleic anhydride: "Addtex ER510E" (MFR (230° C., 2.16 kg) = 2.2 g/10 minutes, Shore D hardness: 47) produced by Japan Polyolefins Kabushiki Kaisha.
[17]Straight-chain low-density polyethylene modified with maleic anhydride: "Addtex ER621F" (MFR (230° C., 2.16 kg) = 3.5 g/10 minutes, Shore D hardness: 45) produced by Japan Polyolefins Kabushiki Kaisha.

The results shown in Tables 11 and 12 indicate the following facts:

Because the mixing amount of the dynamically crosslinked polyolefin thermoplastic elastomer (component (a)) is small and that of the polyolefin thermoplastic elastomer (component (b)) is large in the Comparison Example 31, the olefin thermoplastic elastomer composition thereof has low heat shrinkability.

Because the mixing amount of the dynamically crosslinked polyolefin thermoplastic elastomer (component (a)) is large and that of the polyolefin thermoplastic elastomer (component (b)) is small in the Comparison Example 32, the olefin thermoplastic elastomer composition thereof has low flexibility.

Because the mixing amount of the polyethylene (component (c6)) modified with the acid anhydride is small in the Comparison Example 33, the olefin thermoplastic elastomer composition thereof has low processability. Because the mixing amount of the polyethylene (component (c6)) modified with the acid anhydride is large in the Comparison Example 34, the olefin thermoplastic elastomer composition thereof has low heat shrinkability.

Because the addition amount of the metal hydroxide (component (d)) is small in the Comparison Example 35, the olefin thermoplastic elastomer composition thereof has low non-flammability. Because the addition amount of the metal hydroxide (component (d)) is large in the Comparison Example 36, the olefin thermoplastic elastomer composition thereof has low flexibility and processability.

While this invention has been described in conjunction with the specific embodiments above, it is evident that many alternatives, combinations, modifications, and variations are apparent to those skilled in the art. Accordingly, the exemplary embodiments of this invention, as set forth above are intended to be illustrative, and not limiting. Various changes can be made without departing from the spirit and scope of this invention.

What is claimed is:

1. An olefin thermoplastic elastomer composition comprising:
    (component (a)) 20 to 70 parts by mass of a dynamically crosslinked polyolefin thermoplastic elastomer;
    (component (b)) 20 to 40 parts by mass of a polyolefin thermoplastic elastomer;
    (component (c)) 10 to 40 parts by mass of a styrene elastomer modified with acid anhydride; and
    (component (d)) 120 to 200 parts by mass of metal hydroxide,
    wherein the olefin thermoplastic elastomer composition contains the components (component (a)), (component (b)), and (component (c)) such that a total of parts by mass of the components (component (a)), (component (b)), and (component (c)) is 100.

2. The olefin thermoplastic elastomer composition according to claim 1, wherein
    said dynamically crosslinked polyolefin thermoplastic elastomer (component (a)); and
    said polyolefin thermoplastic elastomer (component (b)) have a Shore A hardness of not less than 80.

3. The olefin resinous composition according to claim 1, wherein
    said metal hydroxide is one of either magnesium hydroxide or aluminum hydroxide; and
    said magnesium hydroxide or the aluminum hydroxide is surface-treated with an amino silane coupling agent.

4. An electric wire coated with the olefin resinous composition according to claim 1.

5. An electric wire coated with the olefin resinous composition according to claim 2.

6. An electric wire coated with the olefin resinous composition according to claim 3.

* * * * *